United States Patent
Ono

(10) Patent No.: US 8,867,641 B2
(45) Date of Patent: Oct. 21, 2014

(54) CONCATENATED TRANSMISSION SYSTEM AND CONCATENATED TRANSMISSION METHOD

(71) Applicant: Kabushiki Kaisha Toshiba, Tokyo (JP)

(72) Inventor: Hideki Ono, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/015,763

(22) Filed: Aug. 30, 2013

(65) Prior Publication Data

US 2014/0010329 A1     Jan. 9, 2014

Related U.S. Application Data

(63) Continuation of application No. PCT/JP2012/052985, filed on Feb. 9, 2012.

(30) Foreign Application Priority Data

Mar. 16, 2011 (JP) ................................ 2011-058064
Feb. 8, 2012 (JP) ................................ 2012-025039

(51) Int. Cl.
    *H04K 1/10*     (2006.01)
    *H04L 27/26*     (2006.01)
    *H04L 5/00*     (2006.01)

(52) U.S. Cl.
    CPC .......... *H04L 27/2628* (2013.01); *H04L 27/262* (2013.01); *H04L 5/0048* (2013.01)
    USPC ........... 375/260; 375/267; 375/295; 375/219; 370/312

(58) Field of Classification Search
    CPC .............. H04L 27/2666; H04L 5/0007; H04L 27/2636; H04L 27/2646; H04B 7/066; H03M 13/655
    USPC ........................................................ 375/260
    See application file for complete search history.

(56) References Cited

U.S. PATENT DOCUMENTS

| | | | |
|---|---|---|---|
| 7,664,189 B2 * | 2/2010 | Kawauchi | 375/260 |
| 2003/0103446 A1 | 6/2003 | Negishi et al. | |
| 2005/0058089 A1 * | 3/2005 | Vijayan et al. | 370/312 |

FOREIGN PATENT DOCUMENTS

| | | |
|---|---|---|
| JP | 2009-016923 A | 1/2009 |
| JP | 2012-044264 A | 3/2012 |
| WO | WO 02/17524 A1 | 2/2002 |

OTHER PUBLICATIONS

International Search Report mailed by Japan Patent Office on Apr. 24, 2012 in the corresponding PCT application No. CPT/JP2012/052985.
Background Art Information for JP 2009-016923.

(Continued)

*Primary Examiner* — Lihong Yu
(74) *Attorney, Agent, or Firm* — Knobbe, Martens, Olson & Bear LLP

(57) ABSTRACT

A concatenated transmission system according to the embodiment generates OFDM signals, from unit transmission waves of broadcast transport streams for a plurality of systems, concatenates the OFDM signals for the respective systems. To generate OFDM signals, the system arranges pilot signals, each having a specific phase, at prescribed positions in the frames, respectively. The system displaces the OFDM signals so that the pilot signal for any unit transmission wave may be identical in position and phase to the pilot signals for the two adjacent unit transmission waves having lower and higher frequencies, respectively.

6 Claims, 3 Drawing Sheets

(56) References Cited

OTHER PUBLICATIONS

Joho Tsushin Shingikai Joho Tsushin Gijutsu Bunkakai Hoso System Iinkai Multi Media Hoso System Sagyohan Hokoku (An), Joho Tsushin Shingikai Joho tsushin Gijutsu Bunkakai Hoso System Iinkai Multi Media Hoso System Sagyohan (Dai 5 kai), Ministry of Public Management, Home Affairs, Posts and Telecommunications, Apr. 27, 2009, http://www.soumu.go/jp/main_content/000028353.pdf.

* cited by examiner

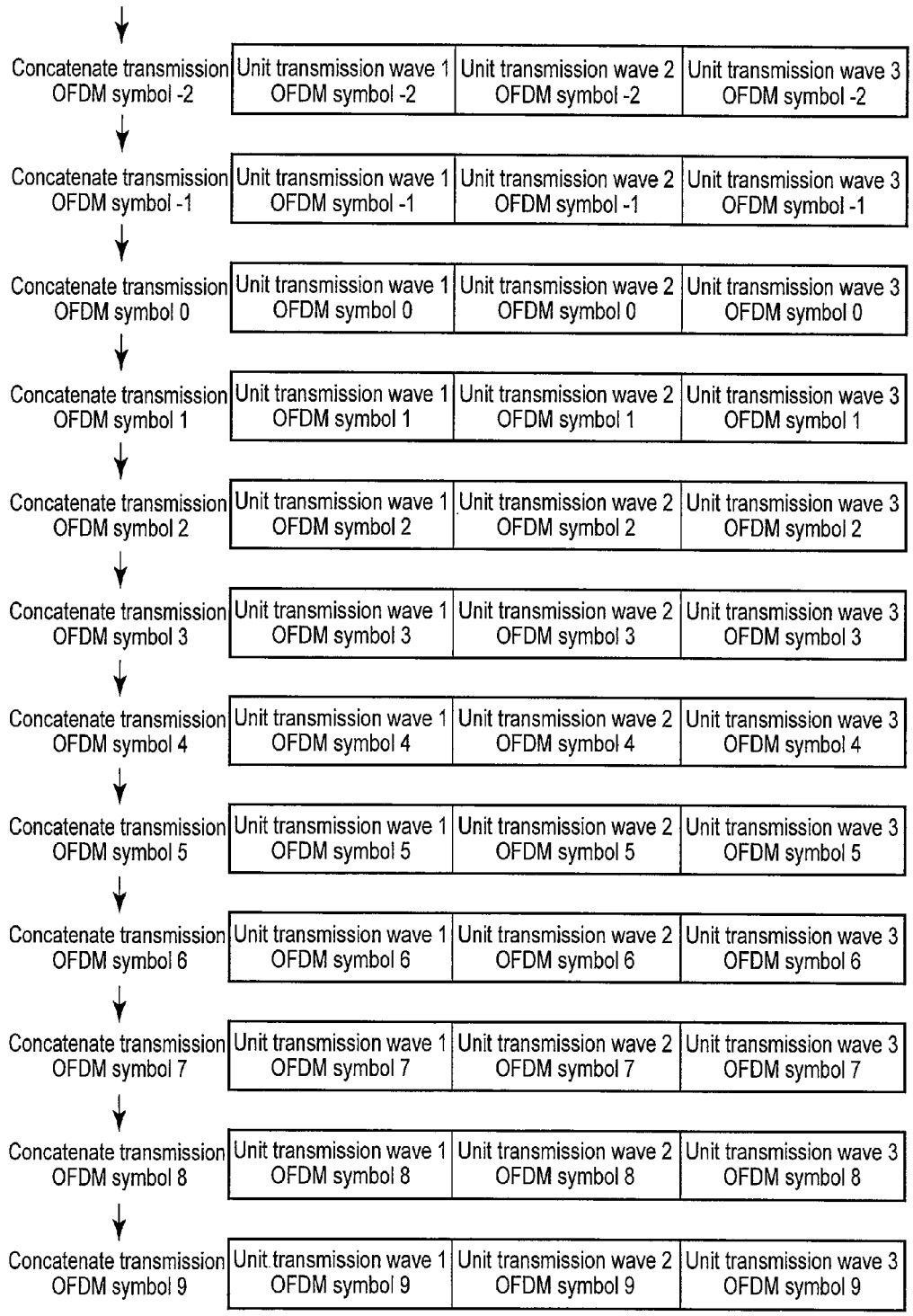
F I G. 2

CONCATENATED TRANSMISSION SYSTEM AND CONCATENATED TRANSMISSION METHOD

CROSS REFERENCE TO RELATED APPLICATIONS

This application is a Continuation Application of PCT Application No. PCT/JP2012/052985, filed Feb. 9, 2012 and based upon and claiming the benefit of priority from Japanese Patent Applications No. 2011-058064, filed Mar. 16, 2011; and No. 2012-025039, filed Feb. 8, 2012, the entire contents of all of which are incorporated herein by reference.

FIELD

Embodiments described herein relate generally to a concatenated transmission system and a concatenated transmission method, in which a plurality of broadcasting TS are concatenated to one another, each perform the OFDM (Orthogonal Frequency Division Multiplexing), thereby first modulating a signal and then transmitting the signal to any other broadcasting TS.

BACKGROUND

As systems fulfilling technical conditions for "multimedia broadcasting system dedicated to mobile terminals" (i.e., multimedia mobile broadcasting standard (ARIB STD-B46), which is planned to come into use in 2011, ISDB-Tmm system and ISDB-Tsb system have been proposed. Both systems are based on ISDB-T. They are characterized in that a 13-segment transmission wave of the transmission standard for terrestrial digital television broadcasting (ARIB STD-B31) and a 1- or 3-segment transmission wave of the transmission standard for terrestrial digital audio broadcasting (ARIB STD-B29) are used as unit transmission waves, which can undergo concatenated transmission, arranged on the frequency axis, without using guard bands. Both systems can therefore achieve an effective use of frequencies. To accomplish practical concatenated transmission, concatenated signals may be subjected to the batch IFFT process, thereby to generate an OFDM signal.

To save energy and lower the cost, the waves should no longer be transmitted once the broadcasting has been stopped. In the concatenated transmission, however, the wave transmission can hardly be stopped in units of waves, because adjacent waves are concatenated together. In order not to transmit a unit broadcast wave, dummy data must be generated and transmitted in place of the unit broadcast wave. (In many cases, the dummy data is an MPEG2-NULL packet.) The dummy data is subjected to transmission-path coding and is then continuously transmitted. If many unit transmission waves are no transmitted, more signals, each having a large peak amplitude, will be generated than in the ordinary broadcast waves. Consequently, as known in the art, the transmission equipment will be adversely influenced.

This is because each NULL packet inserted in place of the data to be broadcast, as described above, assumes the same data value in any unit transmission wave. In the unit transmission wave, the energy is diffused in order to maintain the sufficient randomness of whichever data input. If the unit transmission waves to be concatenated have the same transmission parameter, they will undergo the same signal processing and become identical output signals. These output signals are added in the same phase. The peak amplitude will inevitably much increase.

BRIEF DESCRIPTION OF THE DRAWINGS

FIG. 2 is a diagram explaining how the concatenate processing unit of the concatenated transmission system according to the embodiment performs the concatenated transmission of the existing type.

DETAILED DESCRIPTION

In general, according to one embodiment, a concatenated transmission system includes a plurality of OFDM signal generating units and a concatenate processing unit. The signal generating units generates OFDM signals of OFDM (Orthogonal Frequency Division Multiplexing)-frame structure, respectively, from unit transmission waves of broadcast transport streams for a plurality of systems, each unit transmission wave being composed of at least one segment. The concatenate processing unit concatenates the OFDM signals which have been generated from the unit transmission waves by the OFDM signal generating units, and in which the frame-head parts of the respective OFDM signals are displaced, each from the next one, thereby to generate one concatenated OFDM signal. The signal generating units arrange pilot signals having a specific phase, respectively at prescribed positions in the frames. The concatenate processing unit displaces the OFDM signals so that the pilot signal for any unit transmission wave may be identical in position and phase to the pilot signals for the two adjacent unit transmission waves having lower and higher frequencies, respectively.

Embodiments will now be explained with reference to drawings.

A concatenated transmission system and a concatenated transmission method, both according to this embodiment, will be described with reference to the accompanying drawings.

Figure 1:
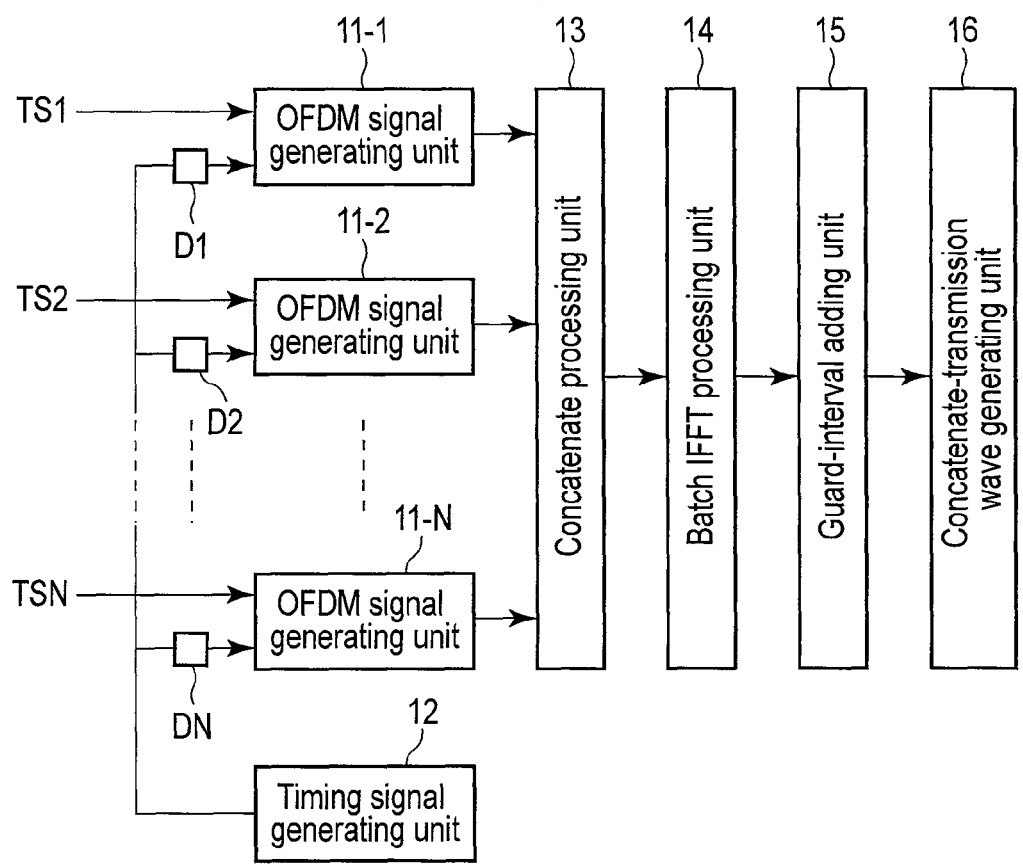
FIG. 1 is a block diagram showing an exemplary configuration of a concatenated transmission system according to an embodiment.

FIG. 1 is a block diagram showing an exemplary configuration of the concatenated transmission system according to this embodiment. FIG. 1 shows a case N concatenated transmissions.

The concatenated transmission system comprises OFDM signal generating unit 11-1 to 11-N, a timing signal generating unit 12, a concatenate processing unit 13, a batch IFFT processing unit 14, a guard-interval adding unit 15, and a concatenated-transmission wave generating unit 16.

First, the OFDM signal generating units 11-1 to 11-N receive unit transmission waves TS1 to TSN, respectively, and the perform transmission-path coding on the unit transmission waves TS1 to TSN, respectively. Further, the OFDM signal generating units 11-1 to 11-N arrange pilot signals, each having a specific phase at the prescribed position in a frame. Thus, the OFDM signal generating units 11-1 to 11-N generate OFDM signals of the OFDM-frame structure. Delay devices D1 to DN delay the timing signal generated by the timing signal generating unit 16, generating signals delayed, one with respect to another. The signals so delayed are supplied to the OFDM signal generating units 15-1 to 15-N, respectively. The OFDM signal generating units 11-1 to 11-N determine the OFDM frame-head positions, from the timing signals they have received, and generate signals. The difference in delay time between any adjacent two of the delay devices D1 to DN is equivalent to the time for transmitting unit transmission waves TS in number of a multiple of 8 of transmission symbol. Hence, the frames of the OFDM signals output from the OFDM signal generating units 11-1 to 11-N are displaced, each from the next one by a multiple of 8 of transmission symbol.

The OFDM signals of unit transmission wave, generated in OFDM signal generating units 11-1 to 11-N is sent to the concatenate processing unit 13.

The concatenate processing unit 13 concatenates the OFDM signals of unit transmission waves for N systems, all input to it. (The frame-head parts of the respective OFDM signals are displaced, each from the next one by a multiple of 8 of transmission symbol.) The OFDM signals concatenated together undergo, all at one time, an IFFT process in the batch IFFT (inverse Fourier Transform) processing unit 14. Then, the guard-interval adding unit 15 adds a guard interval to the OFDM signals. The OFDM signals are then converted to concatenated-transmission wave signals of a prescribed base band, in the timing signal generating unit 16.

Figure 3:
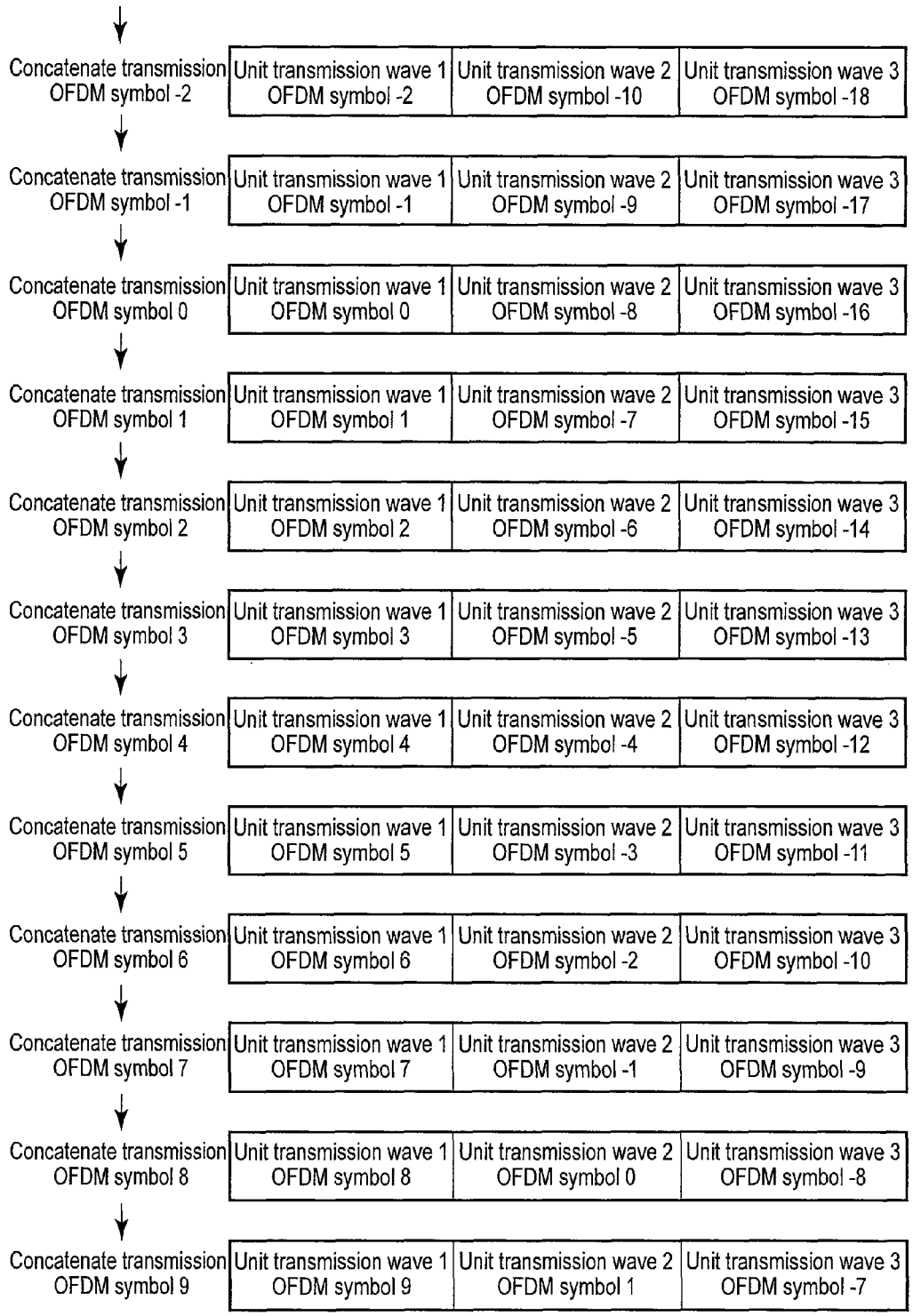
FIG. 3 is a diagram explaining how the concatenate processing unit of the concatenated transmission system according to the embodiment performs the concatenated transmission according to the embodiment.

The process that the concatenate processing unit 13, which characterizes this embodiment, performs will be explained with reference to FIG. 2 and FIG. 3. FIG. 2 shows how the concatenate processing unit 13 performs the concatenated transmission of the existing type. FIG. 3 is a diagram explaining how the concatenate processing unit 13 performs the concatenated transmission according to the embodiment.

In the concatenate processing unit 13, the unit transmission waves are identical, as shown in FIG. 2, in terms of the frame-head symbol (i.e., the position the concatenated transmission OFDM symbol 0 assumes as shown in FIG. 2), at which the TMCC sync words assume value W0. FIG. 2 shows the case where the unit transmission wave is composed of three waves. In this case, totally identical signals will be synthesized if the unit transmission waves are identical in terms of TS data and transmission parameter. This increases the probability of generating signals having large peak amplitudes.

In the concatenated transmission according to the embodiment, the head symbol of the frame in which the TMCC sync word is W0 differs from a unit transmission wave to another as shown in FIG. 3. Signals different from one another are therefore synthesized even if the unit transmission waves have the same TS data and the same parameter. Hence, the probability of generating signals having large peak amplitudes can be prevented from increasing. Moreover, the frame-head part of each unit transmission wave is displaced so that the pilot signal for the unit transmission wave may be identical in position and phase to the pilot signals for the two adjacent unit transmission waves having lower and higher frequencies, respectively. (More precisely, the head symbol of each unit transmission wave is displaced by a multiple of 8 of transmission symbol, as shown in FIG. 3.) The pilot signals for any two adjacent unit transmission waves of high frequency are thereby made identical in both position and phase. Phase compensation for the pilot signals, which the unit transmission waves use in common, can therefore proceed in the same manner as in the concatenated transmission of the existing type. Therefore, the receiving process is never influenced at the receiving side.

Thus, the concatenated transmission system according to this embodiment can suppress an increase in the peak amplitude during the concatenated transmission even if a plurality of unit transmission waves has not been broadcast yet.

The present invention is not limited to the embodiment described above. The components of the embodiment can be modified in various manners in reducing the invention to practice, without departing from the sprit or scope of the invention. Further, the components of any embodiment described above may be combined, if necessary, in various ways to make different inventions. For example, some of the component of any embodiment may not be used. Moreover, the components of the different embodiments may be combined in any desired fashion.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A concatenated transmission system comprising:
    a plurality of OFDM signal generating units configured to generate OFDM signals of OFDM (Orthogonal Frequency Division Multiplexing)-frame structure from unit transmission waves of broadcast transport streams for a plurality of systems, each unit transmission wave being composed of at least one segment; and
    a concatenate processing unit configured to concatenate the OFDM signals which have been generated from the unit transmission waves by the OFDM signal generating units,
    wherein a transmission symbol of a frame-head part of each of the OFDM signals that are concatenated differs from a transmission symbol of an adjacent frame-head part, thereby to generate one concatenated OFDM signal, and
    wherein the OFDM signal generating units arrange pilot signals, each having a specific phase, at a prescribed position in a frame; and the concatenate processing unit displaces the OFDM signals so that the pilot signal for any one of the unit transmission waves is identical in position and phase to the pilot signal for an adjacent unit transmission wave having a lower or higher frequency.

2. The concatenated transmission system according to claim 1, further comprising:
    an inverse Fourier transform unit configured to subject the concatenated OFDM signals to a batch inverse Fourier transform;
    a guard-interval adding unit configured to add a guard interval to the OFDM signals subjected to the inverse Fourier transform; and
    a concatenated-transmission wave generating unit configured to generate a concatenated-transmission wave signal of a prescribed band, from the concatenated OFDM signal to which the guard interval has been added.

3. The concatenated transmission system according to claim 1, wherein if the unit transmission waves for the plurality of systems accord with an ISDB-Tmm system or an ISDB-Tsb system, the concatenate processing unit displaces the transmission symbol of the frame-head part, by a multiple of 8, in the OFDM signals of the unit transmission waves for the plurality of systems.

4. A concatenated transmission method comprising:
    generating OFDM signals of OFDM (Orthogonal Frequency Division Multiplexing)-frame structure from unit transmission waves of broadcast transport streams for a plurality of systems, each unit transmission wave being composed of at least one segment; and concatenating the OFDM signals which have been generated from the unit transmission waves, wherein a transmission symbol of a frame-head part of each of the OFDM signals that are concatenated differs from a transmission symbol of an adjacent frame-head part, thereby to generate one concatenated OFDM signal, and wherein to generate the OFDM signals, pilot signals, each having a specific phase, are arranged at prescribed positions in frames, and to generate the concatenated OFDM signal, the OFDM signals are displaced so that a pilot signal for any one of the unit transmission waves is identical in position and phase to the pilot signal for an adjacent unit transmission wave having a lower or higher frequency.

5. The concatenated transmission method according to claim 4, further comprising:

subjecting the concatenated OFDM signals to batch inverse Fourier transform;

adding a guard interval to the OFDM signals subjected to inverse Fourier transform; and generating a concatenated-transmission wave signal of a prescribed band, from the concatenated OFDM signal to which a guard interval has been added.

6. The concatenated transmission method according to claim 4, wherein if the unit transmission waves for the plurality of systems accord with an ISDB-Tmm system or an ISDB-Tsb system, the frame-head part is displaced by a multiple of 8 of transmission symbol, in the OFDM signals of the unit transmission waves for the plurality of systems.

* * * * *